Feb. 7, 1961 W. E. WIESENTHAL 2,970,627
BARLEY DEBEARDER AND SEED CLEANER
Filed Dec. 22, 1958 3 Sheets-Sheet 3
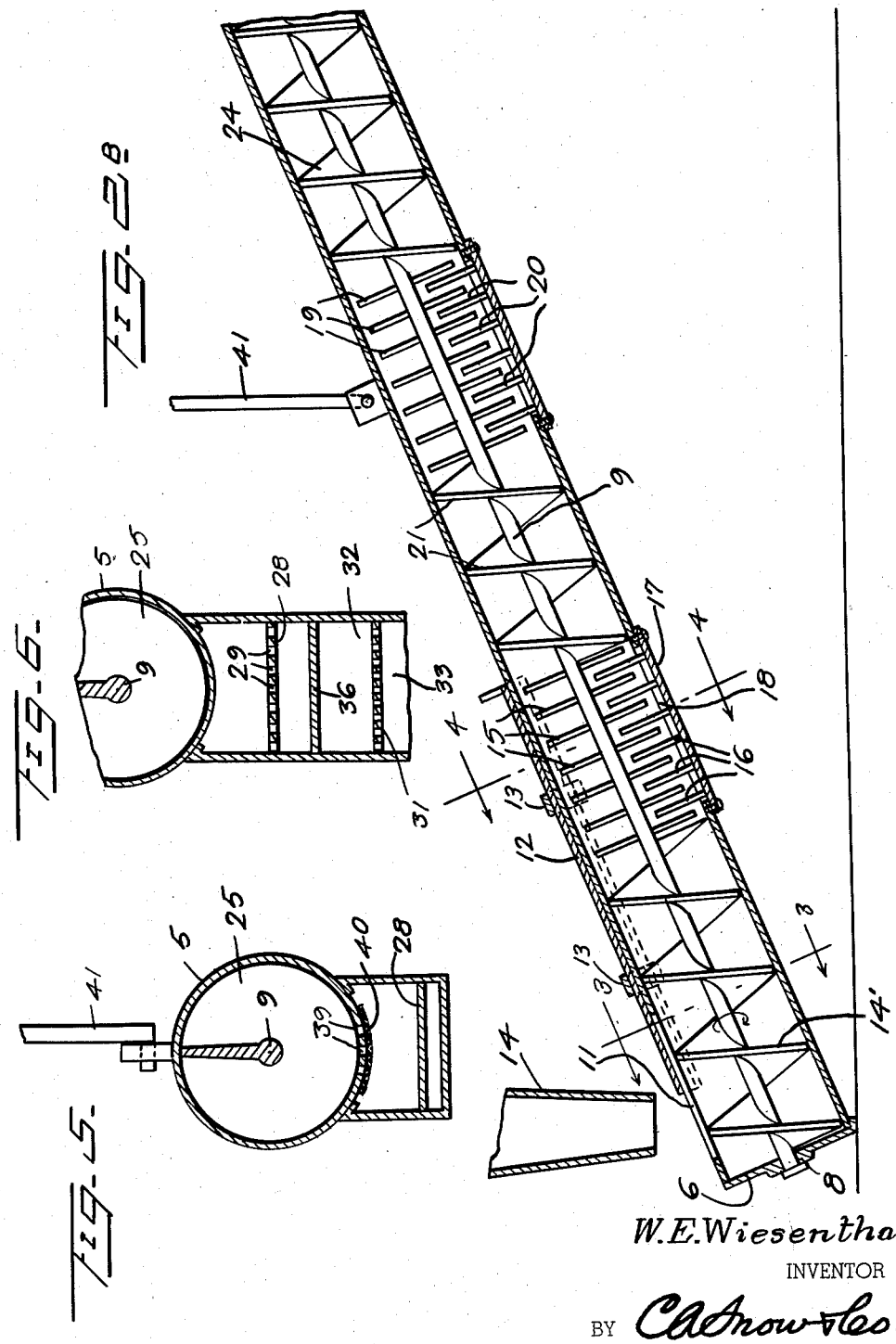
W.E.Wiesenthal
INVENTOR
BY C.A.Snow&Co.
ATTORNEYS.

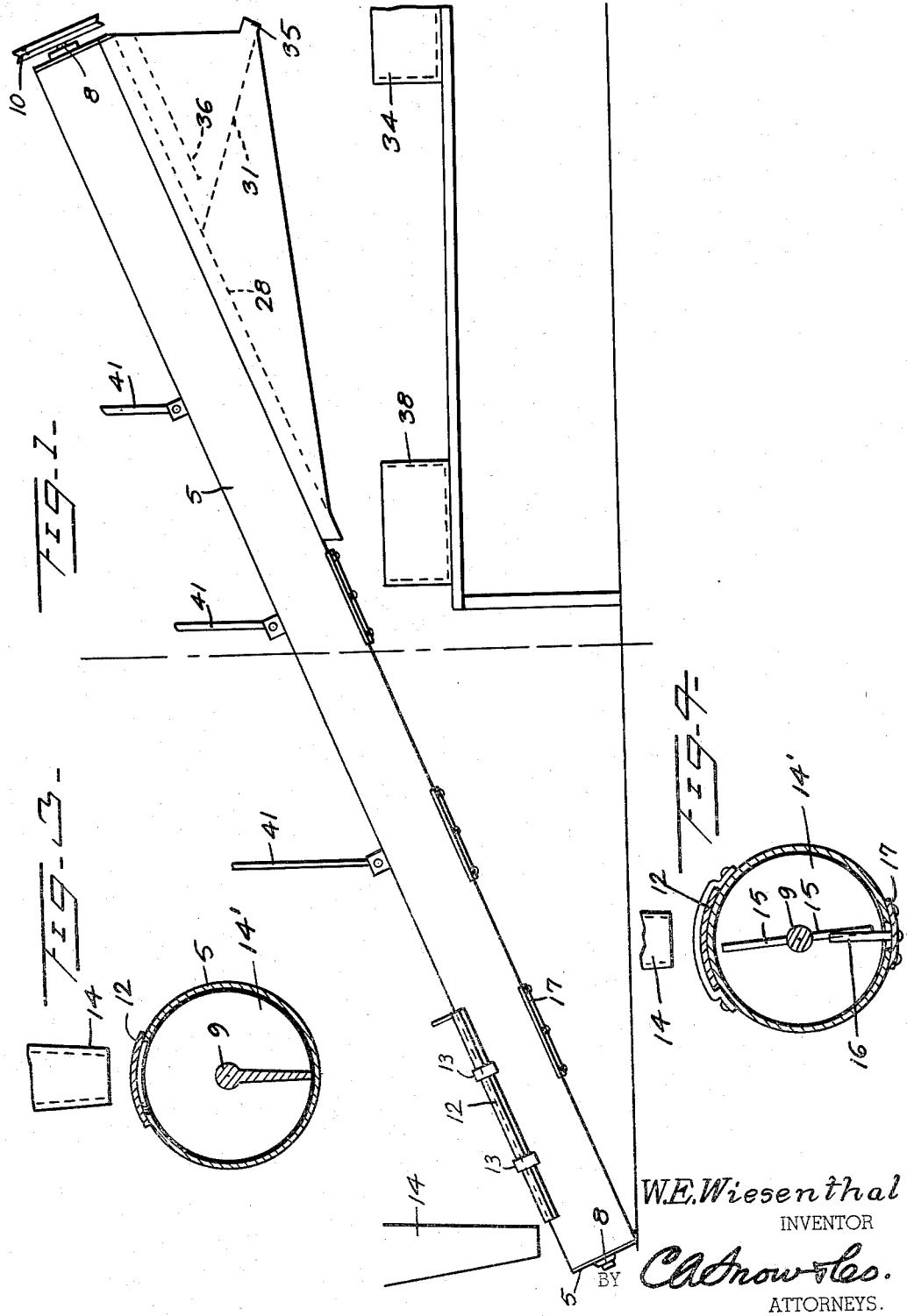

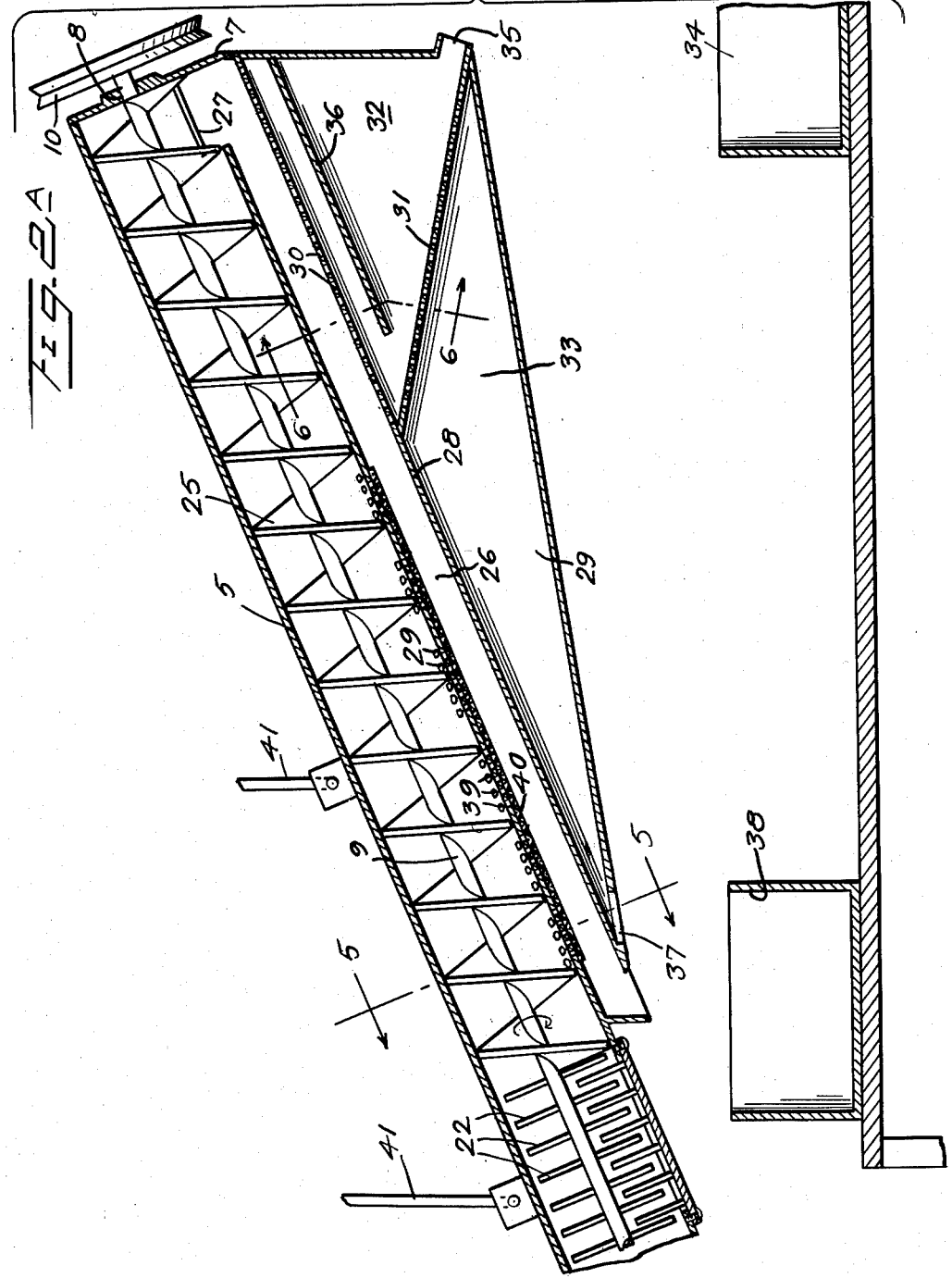

United States Patent Office 2,970,627
Patented Feb. 7, 1961

2,970,627

BARLEY DEBEARDER AND SEED CLEANER

Walter E. Wiesenthal, 6862 S. Broadway, Wichita, Kans.

Filed Dec. 22, 1958, Ser. No. 782,053

1 Claim. (Cl. 146—280)

This invention relates to a seed cleaning and screening apparatus adapted to separate seeds of various crops which have been sown and harvested together.

An important object of the invention is to provide an apparatus of this character which will operate effectively in debearding barley during the barley cleaning operation.

A further object of the invention is to provide an apparatus wherein the various stages of cleaning and classifying the seeds will be accomplished simultaneously with the operation of the apparatus.

With the foregoing and other objects in view which will appear as the description proceeds, the invention consists of certain novel details of construction and combinations of parts, hereinafter more fully described and pointed out in the claim, it being understood that changes may be made in the construction and arrangement of parts without departing from the spirit of the invention as claimed.

Referring to the drawings:

Figure 1 is a side elevational view of an apparatus constructed in accordance with the invention.

Fig. 2A is a longitudinal sectional view through the body of the upper end or discharge end of the apparatus, drawn to an enlarged scale.

Fig. 2B is a longitudinal sectional view through the feed or lower end of the body of the apparatus, drawn to an enlarged scale.

Fig. 3 is a sectional view taken on line 3—3 of Fig. 2B of the drawing.

Fig. 4 is a sectional view taken on line 4—4 of Fig. 2B of the drawing.

Fig. 5 is a sectional view taken on line 5—5 of Fig. 2A of the drawings.

Fig. 6 is an enlarged sectional view taken on line 6—6 of Fig. 2A of the drawings.

Referring to the drawings in detail, the apparatus embodies an elongated tubular inclined body, indicated generally by the reference character 5, the ends of said body being closed by the end walls 6 and 7.

Bearings 8 are formed in the end walls 6 and 7, as better shown by Fig. 2A of the drawings, in which bearings the shaft 9 is mounted, the shaft 9 having a grooved pulley 10 secured on the upper end of said shaft 9 over which pulley a belt from a conventional power device not shown, operates rotating the shaft 9.

The lower or feed end of the body 5 is formed with a feed opening 11 that is normally closed by the sliding closure 12 operating through guides 13, so that the feed spout 14 which is mounted directly above said opening may deliver seed to be treated, to said body.

Secured on the lower end of the shaft 9, for a short portion of its length, is a helical blade 14' which extends axially of said body 5 and constituting with said body, a conveyor for moving the grain under treatment from the feed end of the body through the body.

The shaft 9, directly above the upper end of the helical blade 14', is provided with a group of spikes 15 that are secured in openings formed in the shaft 9, the spikes being of lengths to extend substantial distances beyond the shaft 9. The spikes 15 which rotate with the shaft 9, move between stationary spikes 16 that are mounted on the removable plate 17 which in turn is held in place over an opening 18 formed in the wall of body 5.

Secured to the shaft 9 and arranged in a group, a substantial distance above the spikes 15 and 16, are spikes 19 which cooperate with stationary spikes 20 that extend into the body 5 and operate between the spikes 19, as the spikes 19 are rotated with the shaft 9.

Mounted on the shaft 9 between the groups of spikes 15 and 19, is a helical conveyor blade 21 that receives the grain under treatment and delivers the grain to the group of spikes 19 and 20.

Another group of spikes is secured to the shaft 9 which cooperate with stationary spikes 23 extending into the body between the spikes 22. Between the groups of spikes 19 and 22, is a helical conveyor blade 24 that conveys grain from the spikes 19 and delivers the seeds under treatment to the spikes 22.

The reference character 25 indicates a substantially long helical conveyor blade that extends from the last mentioned group of spikes 22, to the discharge end of the body 5, where seeds which have passed through the body and cleaned, are delivered into the passage 26 through an opening 27, at the upper end of said tubular inclined body 5.

As better shown by Fig. 2A of the drawings, the upper wall 28 of the compartment 33 is inclined so that seeds will gravitate thereover, a portion of the upper wall having openings 30 formed therein to screen the seeds according to size, that pass over said inclined upper wall.

An apertured screening wall 31 partitions the chute into compartments 32 and 33, the wall 31 being inclined rearwardly so that seeds may pass over the wall 31 and be delivered to the receptacle or bin 34 through a spout 35. An inclined wall 36 is mounted within the compartment 32 in parallel spaced relation with said upper wall 28, with its lower end spaced from the screening wall 31 so that seeds may pass from the upper portion of the compartment 32, onto the screening wall 31.

An opening 37 is formed in the bottom of compartment 33 to permit the discharge of foreign or extraneous matter separated from the desirable seeds to be deposited into the receiving bin 38.

As shown by Fig. 2A of the drawings, the lower side of the wall of the body 5 adjacent to the discharge end thereof, is formed with a plurality of screening openings 39 over which the helical conveyor blade 25 operates forcing seeds of a predetermined size, through the screening openings 39.

A screen 40 is disposed over the openings 39 for separating the various defective seeds from normal desired seeds, or seeds from different crops that have been sown together and which may be fed through the machine during the cleaning operation.

Hangers 41 provide means for supporting the body 5 in the desired convenient location and at the desired angle for carrying out the cleaning operation.

In operation, the barley seeds to be debearded and cleaned, are delivered through spout 14 into the lower end of the tubular body 5, through opening 11. The shaft 9 is set in motion which results in the seeds being conveyed throughout the length of the body, to the upper end of the body, passing the seeds between the groups of spikes which separate the foreign or extraneous matter from the seeds, and at the same time separating various types of undesired seeds from the barley seeds, delivering the cleaned seeds at the upper end of the body where the cleaned seeds are deposited in suitable bins, the foreign seeds and extraneous matter being delivered to bins for disposal.

Having thus described the invention, what is claimed is:

An apparatus for debearding and cleaning barley seeds, comprising an elongated inclined tubular body having an elevated discharge end, bearings at the ends of said tubular body, a power shaft extending throughout the length of said tubular body mounted in said bearings, spaced helical conveyor blades mounted on said shaft, said tubular body having openings in the wall thereof between certain of said groups spaced a substantial distance from the elevated discharge end of said conveyor blades, groups of rotary spikes secured to said shaft and disposed between said helical conveyor blades, removable closer plates normally closing said openings in the wall of the body, groups of stationary spikes secured to said plates, arranged in predetermined spaced relation with respect to each other, throughout a portion of the length of said inclined tubular body and extending into said body, said stationary spikes being disposed between said rotary spikes, said body having a feed opening through which seeds are delivered to said body, said body having a series of screening openings through which foreign seeds and extraneous material are directed, said helical conveyor blades and spikes operating to move seeds to be cleaned through said body.

References Cited in the file of this patent
UNITED STATES PATENTS

| | | |
|---|---|---|
| 24,817 | Newell | July 19, 1859 |
| 522,996 | Mead | July 17, 1894 |
| 1,066,344 | Urgelles | July 1, 1913 |
| 1,385,071 | Dibert | July 19, 1921 |
| 2,115,674 | Sutton et al. | Apr. 26, 1938 |